United States Patent [19]

Bennett

[11] Patent Number: 5,697,560
[45] Date of Patent: Dec. 16, 1997

[54] FIBERGLASS CUTTING APPARATUS AND METHOD

[75] Inventor: Bobby Ben Bennett, Reidsville, N.C.

[73] Assignee: Etc. Industries, Inc., Eden, N.C.

[21] Appl. No.: 599,369

[22] Filed: Mar. 11, 1996

[51] Int. Cl.$^6$ .................................................. B02C 4/02
[52] U.S. Cl. .................... 241/29; 241/159; 241/186.35; 241/227
[58] Field of Search .............................. 241/159, 186.35, 241/227, 29

[56] References Cited

U.S. PATENT DOCUMENTS

| | | |
|---|---|---|
| 2,417,599 | 3/1947 | Joyce, Jr. .................................. 241/159 |
| 2,509,147 | 5/1950 | Hurst .................................... 241/159 X |
| 4,068,805 | 1/1978 | Oswald ...................................... 241/159 |
| 4,682,523 | 7/1987 | Johnson et al. . |
| 5,340,034 | 8/1994 | Jang ............................................ 241/3 |
| 5,373,763 | 12/1994 | Takahara . |
| 5,447,276 | 9/1995 | Aldridge et al. .......................... 241/79 |

*Primary Examiner*—John M. Husar
*Attorney, Agent, or Firm*—Rhodes, Coats & Bennett

[57] ABSTRACT

Fiberglass filaments are cut into fiberglass staple fibers having a maximum predetermined length with an apparatus comprising a cutter to cut the filaments into fiber segments; a fiber aligner to align the fiber segments in a given direction; and a chopper for cutting said fiber segments transverse to the given direction at spaced intervals having a spacing equal to the predetermined length.

14 Claims, 2 Drawing Sheets

FIBERGLASS CUTTING APPARATUS AND METHOD

BACKGROUND OF THE INVENTION

The present invention relates to a method and apparatus for cutting fiberglass filament into staple fibers, and in particular to the conversion of fiberglass filaments, especially heretofore discarded continuous fiberglass filaments, into usable staple fibers of a predetermined maximum length. According to the invention, fiberglass filaments are first conveyed along a pathway into engagement with a plurality of rotating cutting blades oriented longitudinally to the pathway to cut the filaments into fiber segments. The fiber segments are then aligned parallel to each other and carded along a pathway into engagement with a plurality of chopping blades oriented transversely to the pathway to cut the fiber segments into staple fibers having a predetermined maximum length equal to the spacing between the chopping blades.

Continuous fiberglass filaments are manufactured by extruding molten glass through a spinnerette, followed by attenuating the extruded material. The resultant filaments, after solidifying, may then be directed to another area for conversion into desired products, or collected on a bobbin for storage prior to further processing. Formation of the filaments also normally involves treating the filaments with a binder to enhance the properties of the fiberglass in subsequent operations.

As used in describing the invention, the term "continuous filament" is intended to include a single filament or a plurality of filaments in a strand, with the filament having a substantial length, e.g., greater than 1 foot. Also, a "plurality of filaments" is intended to encompass a plurality of segments of a single filament in adjacent relationships, such as occurs when a single filament is wrapped around a bobbin tube. The term "fiber segment" describes fibers having a length less than the filaments, but greater than the predetermined staple fiber lengths produced by practice of the present invention.

When fiberglass packages are formed, the continuous filament is wound onto a tube utilizing various methods and apparatus well known in the pertinent art. When the package is to be used in a subsequent process, the robe is removed torn the interior of the package. The inner end of the filament is then pulled from within the interior of the package to unwind the filament.

As a result of the adhesion of adjacent filament sections in the outer part of the package by the treatment material, however, all of the filament may not be unwound from the package. Thus, the final portion of the package comprised of a continuous band of fiberglass filament adhered by the treatment material, and commonly referred to in the pertinent industry as a "hull," has heretofore been discarded, resulting in environmental concerns and economic loss. Other processes used in the manufacture or subsequent processing or use of fiberglass filaments may produce filaments that are normally discarded or reprocessed instead of being used in products.

Numerous prior art patents describe cutting of fiberglass filaments into staple fiber at the time of manufacture. Generally, the apparatus and method disclosed in these patents involves engaging a continuous strand of one or a few fiberglass filaments immediately after extrusion, with a chopping roller rotating perpendicular or transverse to the path of the strand. The chopping roller is comprised of a roller core with a plurality of spaced chopping blades projecting radially outwardly from, and parallel to, the axis of the core. Normally, filaments are engaged between the blades of the chopping roller and an adjacent surface, such as a resilient roller, to create a bending action, breaking the continuous filaments into staple fiber segments.

Examples of these prior art teachings include the following patents:

| U.S. Pat. No. | Inventor(s) |
| --- | --- |
| 5,003,855 | Ciupak |
| 4,706,531 | Blauhut et al |
| 4,637,286 | Boggs |
| 4,576,621 | Chappelear et al |
| 4,373,650 | Gay |
| 4,287,799 | Fujita et al |
| 4,265,151 | Carruth et al |
| 4,254,536 | Lehner |
| 4,237,758 | Lindner et al |
| 4,043,779 | Schaefer |
| 3,873,290 | Marzocchi |
| 3,815,461 | Genson |
| 3,648,554 | Arnold et al |
| 3,508,461 | Stream |

The apparatus and methodology described in the above patents is suitable for chopping continuous, extruded fiberglass filament into staple fibers. However, the technology is not amenable to the conversion of the above hulls, or other post-manufactured filaments into useful staple fiber. Therefore, if these hulls or other filaments are to be converted into useful staple fibers, a method and apparatus operating on an entirely different principal is necessary.

Commonly assigned U.S. patent application Ser. No. 08/574,258, filed Dec. 18, 1995, now pending naming the present inventor as a joint inventor, describes an apparatus and method for cutting fiberglass hulls. As described in that application, which is incorporated herein by reference in its entirety, fiberglass filament hulls are first compressed and then cut to form staple fibers with a cutter comprised of a cutting roller and a pressure roller.

The cutting roller is comprised of a plurality of equally spaced, circular, diamond coated cutting blades separated by circular spacers having a diameter less than the diameter of the cutting blades, and a circumferentially grooved pressure roller positioned parallel to the cutting roller and forming a nip therewith, with the periphery of the blades extending in non-engaging relation into the grooves. The hulls are carded into the nip of the roller pair by a conveyor with the hull filaments being oriented substantially transverse to the blades while the cutting roller is rotated at a significantly greater speed than the pressure roller, whereby the hull filaments are held against the cutting roller by the pressure roller, and cut into staple fiber lengths by the blades.

While the apparatus and method described in the preceding application is effective in cutting filaments into fiber lengths, the somewhat random orientation of the filaments as they engage the cutting roller results in some fibers which have a length longer than the desired staple length. That is, a filament oriented exactly transverse to the cutting roller will be severed into lengths equal to the distance between adjacent cutting blades. However, if the filament is positioned at an oblique angle, i.e., at an orientation somewhere between transverse to the cutting blades and longitudinally oriented to the blades, the resultant fibers will have a length greater than the desired staple length. Since it is preferable to use staple fibers that do not exceed a predetermined length, there is a need to further improve the above process to ensure that the fibers produced do not exceed the predetermined length. Expansion of the parameters of the process to make it more suitable for processing of other fiberglass filament bundles, especially those comprised of only a few filaments or filaments without a binder, is also needed.

Accordingly, it is an aspect of the present invention to provide a method and apparatus for converting bundles of continuous fiberglass filaments into staple fibers that do not exceed a predetermined length. A particular objective is to provide a method and apparatus for cutting a bundle of filaments into staple fibers that do not exceed a predetermined length by first conveying a bundle of filaments along a first pathway into engagement with a plurality of longitudinally oriented cutting blades, aligning the resultant fiber segments parallel to a second pathway, and cutting the aligned fibers with a plurality of chopper blades aligned transverse to the second pathway to cut the fibers into staple fibers that do not exceed a predetermined length equal to the spacing of the chopper blades.

SUMMARY OF THE INVENTION

This invention specifically relates to a method and apparatus for cutting fiberglass filament bundles into staple fibers useful for various purposes, including reinforcement of molded plastic articles. Specifically, the present invention contemplates cutting a bundle of fiberglass filaments to form a plurality of fiber segments; aligning the fiber segments in a given direction; and cutting the fiber segments into staple length fibers not exceeding a predetermined length. Thereafter the staple length fibers may be collected for subsequent processing or use.

The apparatus is comprised of a conveyor for conveying fiberglass filaments along a first pathway; a cutter having cutting blades oriented parallel to the first pathway to sever the filaments into fiber segments; a fiber aligner extending from the cutter along a second pathway to align the fiber segments parallel to the direction of the second pathway; and a chopper having chopper blades oriented transverse to the second pathway to sever the fiber segments into staple fibers having a maximum length equal to the distance between the chopper blades.

The cutter is comprised of a cutting roller having a plurality of rotating, circular cutting blades, and a pressure means, such as a pressure roller, to hold the filaments against the periphery of the cutting blades. The cutting roller of the invention is comprised of a rotatable shaft, a plurality of circular cutting blades or disks supported perpendicular to the shaft at a predetermined distance from each other, and a plurality of spacers between the blades to position the blades at the desired spacing.

Each cutting blade is in the shape of a circular disk with a central shaft receiving opening. In most applications, the blades will have a diameter of from about 1 inch to about 16 inches, and preferably from about 6 inches to about 8 inches. The central opening in the blade will be substantially equal to the diameter of the shaft upon which the blades are mounted. The cutting blades are preferably constructed, at least at their periphery, of a material having a hardness greater than the fiberglass to be cut. Preferably, the blades are diamond coated blades.

Disk-shaped spacers carded on the shaft alternate between the blades. These circular spacers also include a central opening for positioning of the spacers on the shaft. The diameter of the spacer is less than the diameter of the adjacent cutting blades, so that the blades project outwardly beyond the spacers. Desirably, the blades will project from about 0.25 inch to about 2.0 inches, and preferably from about 0.50 inch to about 0.75 inch beyond the outer periphery of the spacer.

The spacers may be formed of various materials but preferably are of a material that will withstand forces to which they are subjected during high speed rotation and cutting operations. Suitable materials include steel and aluminum. The width of the spacers will be approximately equal to the length of the staple fiber to be cut, e.g., from about 0.125 inch to about 2.0 inch, and preferably from about 0.25 inch to about 1.0 inch.

The pressure roller used to hold the fiberglass filaments against the cutting blades is comprised of a central rotatable shaft with a resilient outer covering. When assembled, the blades of the cutting roller will project against the outer surface of the pressure roller at the nip of the rollers to compress the surface at the points of contact with the blades.

Drive means is provided for rotating the pressure and cutting rollers. An adjustment means may also be provided for adjustably positioning the pressure roller relative to the cutting roller. A frame is also provided for mounting the rollers and conveyor in the desired position. The drive means is geared to rotate the cutting roller and the pressure roller at substantially equal peripheral speeds so that the filaments entering the roller nip will be pinched between the blade and the roller surface and thus will be cut or broken into fiber segment lengths.

The fiberglass filaments can be brought into engagement with the cutter using a conveyor with a loading end for introducing the fiberglass filaments and a discharge end positioned adjacent the nip of cutter, whereby fiberglass filaments carded by the conveyor is discharged into the roller nip and into engagement with the cutting blades. Preferably, the conveyor is comprised of a pair of opposed surfaces, with at least one surface being movable in the direction of the roller pair nip.

The opposed surfaces desirably converge partially along at least a portion of the length of the conveyor in order to compress fiberglass bundles introduced onto the conveyor. This convergence can be achieved by utilizing one surface having an initial segment converging towards the opposed surface and a distal segment substantially parallel to, or slightly converging towards, the opposed surface.

In the preferred embodiment, one surface of the conveyor is stationary while the other surface is movable. In this embodiment, the movable surface may be comprised of a continuous conveyor belt. The width of the conveyor surfaces should be approximately equal to each other and need be no wider than the width of the roller pair.

A drive means is provided to drive the roller pair comprising the cutter, and may be, for example, an electric motor geared to the shafts of the rollers. Preferably the drive means is adapted to rotate the rollers at from about 1 rpm to about 100 rpm. The cutting and pressure rollers are geared to rotate at substantially the same peripheral speed.

The roller pair of the cutter is supported on an adjustable framework so that the roller shafts, while being maintained in a parallel relationship, can be moved away from or toward each other to change the pressure of the blades of the cutting roller against the pressure rollers. As a result of this change and the relative relationship of the two rollers, the operational characteristics of the roller pair can be changed to optimize the cutting action with respect to filament bands which may vary in size, or other characteristics which effect the cutting conditions.

This adjustment may be effected by several means known in the prior art. For example, one of the rollers can be mounted in an adjustable framework positioned relative to the framework holding the other roller by a worm gear that can be turned to move the adjustable framework toward or away from the other framework. The apparatus also includes additional supports for holding the conveyor and roller pair in position relative to each other. Passing of fiberglass filaments through the cutter severs the filaments into fiber segments having a length equal to the width of the cutting blades or greater, depending on the orientation of the filament relative to the cutting blades. For many end uses of the fibers, however, the fibers should not exceed a predetermined maximum length. Therefore, the present invention makes provision for a further cutting or breaking of the fibers so that the desired maximum length is not exceeded.

Fibers discharged from the cutter will have a somewhat random orientation. In order to cut these fiber segments to a maximum length, it is necessary to first orient the fiber segments substantially parallel to each other and to a pathway. This orientation may be achieved, for example, by discharging the fibers onto an inclined surface having parallel channels or grooves extending along the pathway from an upper end to a lower end of the surface.

Fiber segments discharged onto the surface of an aligner of this construction slide downwardly along the surface toward the lower, discharge end of the surface. In doing so, the frictional engagement against the surface tends to align the fiber segments in the grooves so that the fiber segments are aligned parallel to the pathway, i.e., the direction of movement of the fiber segments. Thus, when the fiber segments are discharged from the aligner, they can be cut to a maximum length.

The exact construction of the aligner, and the orientation of the pathway may vary depending upon operating condition. Generally, however, the aligner surface will include a plurality of adjacent, parallel, V-shaped grooves extending from the upper end of the surface to the lower end. Each groove may be formed of a pair of walls joined at a lower midpoint at an angle, e.g., 90°. The surface is normally inclined at an angle of form about 45° to about 80°, with the distance between said grooves being from about 0.125 to about 2 inches.

A chopper is positioned at the discharge end of the aligner to receive the aligned fiber segments. Preferably, the chopper is comprised of a chopping roller rotating perpendicular or transverse to the path of the aligned fibers. The chopping roller is comprised of a roller core with a plurality of spaced chopping blades projecting radially outwardly fore, and parallel to, the axis of the core, with the chopping roller being positioned so that the chopping blades engage the fibers.

A surface, e.g., a pressure roller, is positioned opposite the fibers from the chopping blades so that the fibers are compressed between the blades and the surface to sever the fibers into staple fiber lengths equal to the spacing between the chopper blades. Thus, since all of the fibers discharged from the cutter are oriented transverse to the chopping blades, and since the distance between the chopping blades is equal to the desired length of the staple fibers, all of the fibers will be chopped into lengths that do not exceed the desired staple fiber length.

Drive means is provided for rotating the chopping and pressure rollers. An adjustment means may also be provided for adjustably positioning the pressure roller relative to the chopping roller. A frame is also provided for mounting the rollers and conveyor in the desired position. The drive means is geared to rotate the chopping roller and the pressure roller at substantially equal peripheral speeds so that the fiber segments entering the roller nip will be pinched between the blade and the roller surface and thus will be cut or broken into fiber lengths.

In operation, a bundle of fiberglass filaments is conveyed along a first pathway toward the cutter. In the case of a fiberglass hull, the axis of the hull will be substantially parallel to the direction of the conveyor. During conveying, the opposed surfaces of the conveyor compress the filaments into a flattened state. The compressed band is released at the discharge end of the conveyor into the nip of the cutter, with the cutter rollers being rotated in opposite directions so that their adjacent surfaces are rotated away from the conveyor, i.e., the upper surfaces of the rollers are rotated toward each other. As the filaments enter the roller nip, the filaments are severed into fiber segments.

Fiber segments discharged from the cutter are carried, e.g., by gravity, along a second pathway, which may be inclined downwardly from the fast pathway to align all of the fibers in a given direction. The aligned fibers are then cut transverse to the direction of alignment with a chopper roll having spaced blades to sever the fibers into staple fiber lengths having a maximum length equal to the distance between the blades of the chopper roll.

Other features of the invention will be apparent to one skilled in the art upon a reading of the detailed description of the invention which follows, taken together with the drawings. In the description, terms such as horizontal, upright, vertical, above, beneath and the like are used solely for the purpose of clarity in illustrating the invention, and should not be taken as words of limitation.

DETAILED DESCRIPTION OF THE PREFERRED EMBODIMENT

Figure 1:
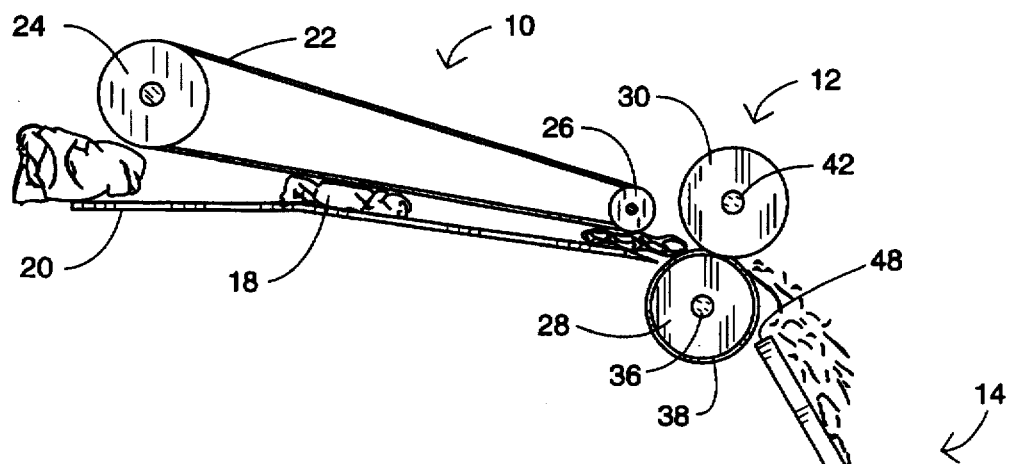
FIG. 1 is a side view of the apparatus, showing feeding of the filament bundles.
Figure 2:
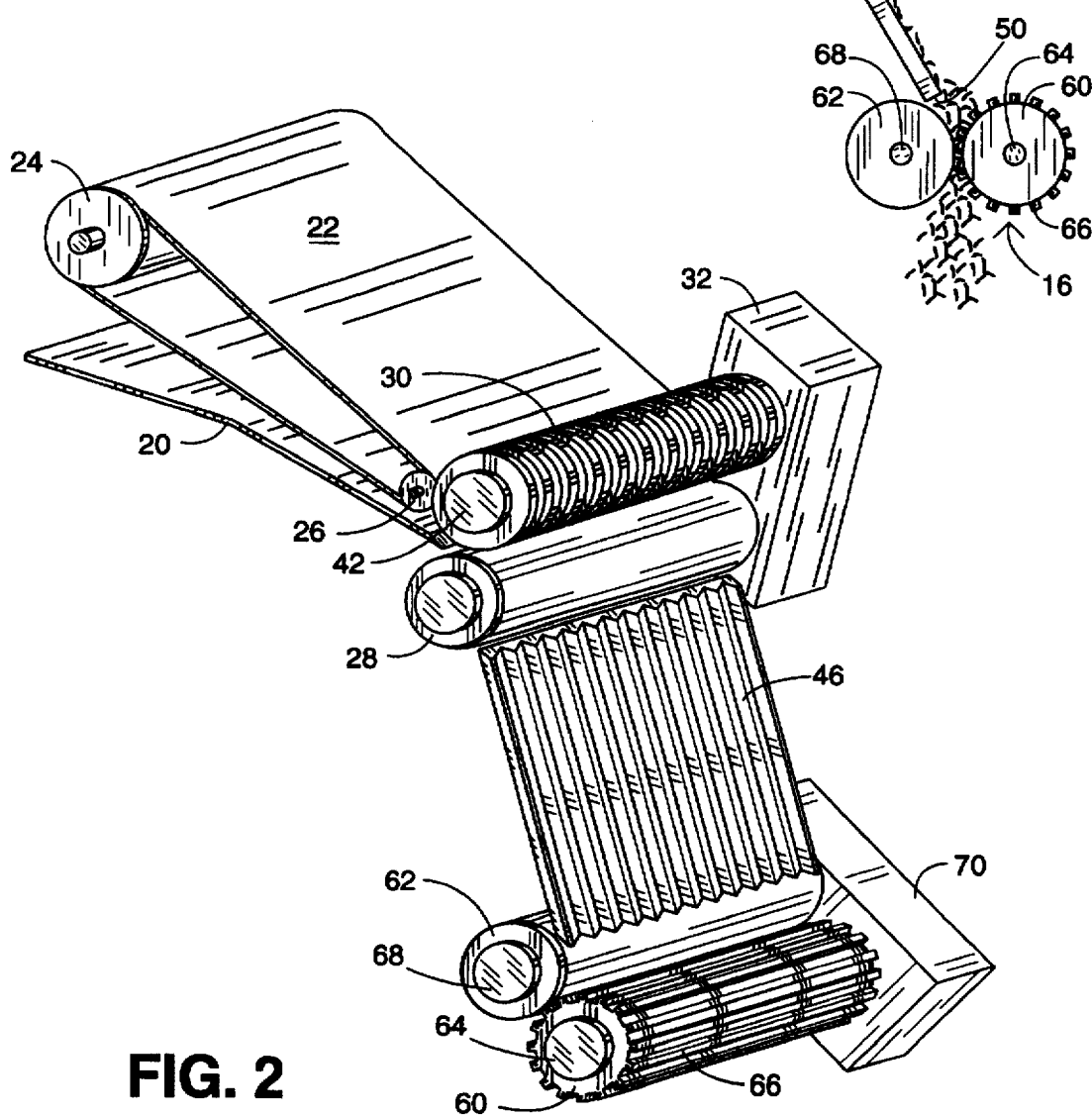
FIG. 2 is a perspective view of the apparatus of the present invention, with the supporting framework and drive means omitted for clarity.
Figure 3:
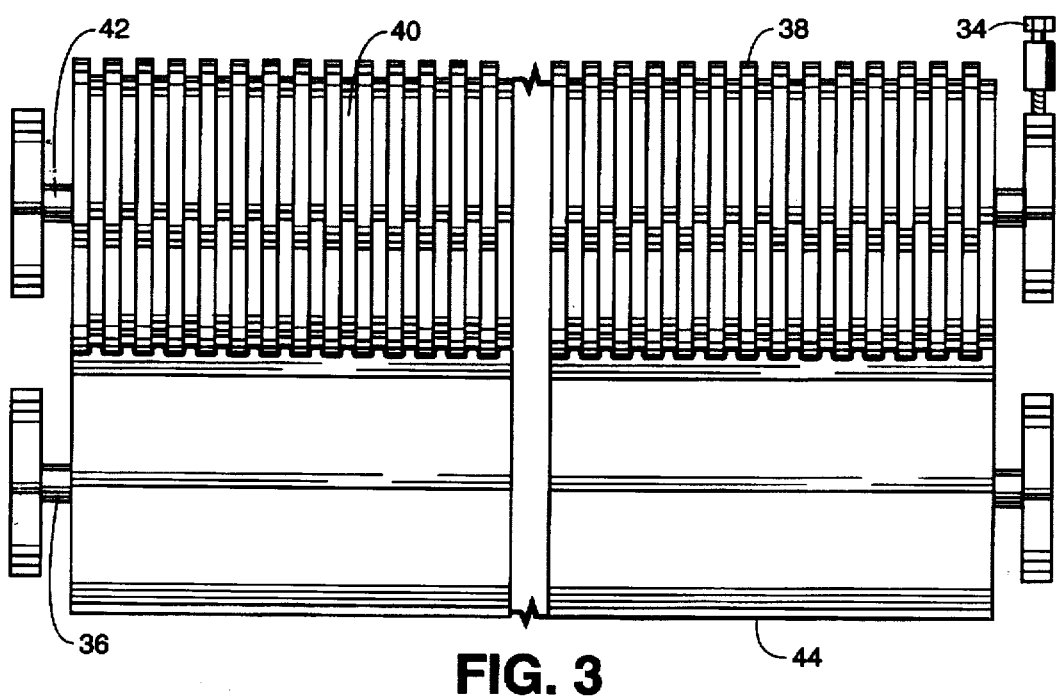
FIG. 3 is a sectional end view of the cutter.
Figure 4:
FIG. 4 is a sectional end view of the aligner.
Figure 5:
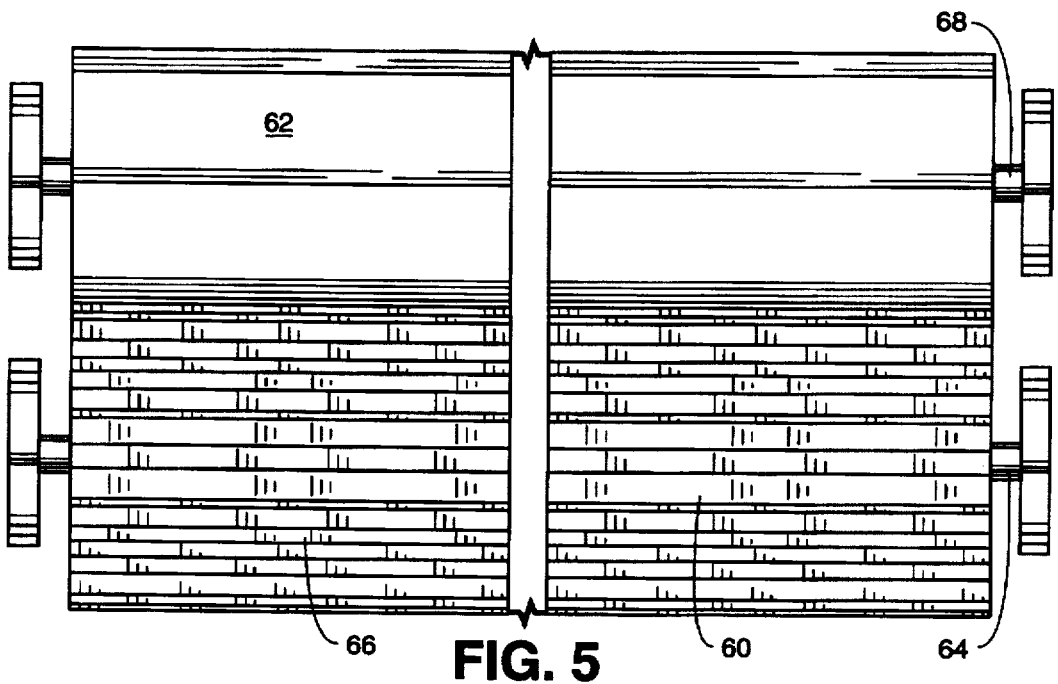
FIG. 5 is a sectional end view of the chopper.

The apparatus of the invention, as best illustrated in FIGS. 1 and 2, is comprised of a conveyor, generally 10, a cutter, generally 12, an aligner, generally 14, and a chopper, generally 16.

Conveyor 10, positioned to convey filament bundles 18 to cutter 12, is comprised of a stationary surface 20 and continuous conveyor belt 22 around rollers 24 and 26. A drive means, not shown, rotates roller 24 to carry the lower surface of conveyor belt 22 in the direction of cutter 12.

Cutter 12 is comprised of a cutting roller 28 and a pressure roller 30 aligned parallel to cutting roller 28. An adjustable drive means 32 is provided for rotating cutting roller 28 and pressure roller 30. Adjustment means 34 is provided to adjustably position pressure roller 30 in relation to cutting roller 28. An adjustable support frame, is provided to mount surface 20 and conveyor 22 so that compressed fiberglass bundles are fed into the nip of milers 28 and 30.

Cutting roller 28 is comprised of a rotatable shaft 36, supporting a plurality of equi-spaced circular cutting blades or disks 38, and a plurality of alternating, equal sized spacers 40 to space blades 38 at a predetermined, equal distance from each other. Blades 38 are of a disk or circular shape, and are preferably diamond coated. In the preferred embodiment, blades 38 have a diameter of 6.0 inches, and a thickness of 0.035 inch. Cutting roll spacers 38, as shown in the preferred embodiment, have a diameter of 5 inches. As a result, blades 38 project beyond the outer edge of spacers 38 a distance of 0.50 inch. Spacers 40 have a width of 0.375 inch.

Rollers 28 and 30 are adjustably positioned with shafts 36 and 40, respectively, in parallel alignment. The drive means is adapted to rotate roller 28 and 30 at equal peripheral speeds.

Filaments engaged by cutter 12 are cut into fibers of varying lengths, depending on the orientation of the filaments when fed into the nip of cutter 12. For example, filaments axially aligned with the shafts of rollers 28 and 30 will be cut into lengths approximately equal to the distances between blades 38. However, filament sections aligned perpendicular to the axes of rollers 28 and 30 can be of substantially greater length, being severed only where the curvature of the filament engages adjacent blades.

Aligner 14 is comprised of a downwardly inclined surface or plate 46 having an upper receiving end 48 adjacent the discharge side of cutter 12 and a lower discharge end 50 adjacent the nip of chopper 16, whereby fibers discharged from cutter 12 will fall onto surface 46 at receiving end 48 and slide downwardly on surface 46 to discharge end 50, whereat the fibers will be discharged in parallel alignment into the transversely positioned nip of chopper 16.

Surface 46 includes a plurality of adjacent, parallel, V-shaped grooves 52 extending from end 48 to end 50. Each groove 52 is comprised of a pair of walls 54 and 56 joined at a lower midpoint 58 at an angle of 90°. The distance between groove midpoints is 0.035 inch or greater. Surface 46 has a length between ends 48 and 50 of 18 inches.

Chopper 16 adjacent discharge end 50 of aligner 14 is comprised of a chopper roll 60 and a pressure rail 62. Chopper rail 60 is carded on shaft 64. A plurality of chopper blades 66 extend radially outward from roll 60 and along roll 60 parallel to shaft 64. Each chopper blade 66 extends 0.5 inch from the surface of roll 60 and has a width of 0.035 inch. Preferably, blades 66 are formed of hardened carbide steel. The distance between blades in the preferred embodiment is 0.5 inch. The diameter of roll 60 from the outer edges of blades 66 is 8 inches.

Pressure roll 62 is carded on shaft 68 parallel to shaft 64, and has a resilient surface that is deformed when engaged by the edge of blade 60, resulting in sharp bending and breaking of fibers between blades 66 and roll 62. Roll 62 is 8 inches in diameter, and the distance between shafts 64 and 68 is slightly less than the combined radii of the rolls, so that the edges of blades 66 will press into the surface of pressure roll 62. Drive means 70 rotates chopping roller 60 and pressure roller 62.

In operation, filament bundles 18 are conveyed to cutter 12 while being compressed between surface 20 and conveyor belt 22, and are discharged into the nip between cutting roller 28 and pressure roller 30, to be cut into fiber segments of varying lengths, depending on the orientation of the filaments entering the roller nip. Fibers are then oriented in parallel alignment by being discharged onto surface 46 of aligner 14, whereby the fibers slide down surface 46 and are aligned parallel to the axis of aligner 14 within grooves 48. Aligned fibers are then discharged into the nip of chopper roll 60 and 62 which rotate away from discharge end 50 of surface 46. Fibers are broken where engaged between a blade 66 and the surface of roll 62, resulting in severing of the fibers into staple fiber lengths having a maximum length.

Certain modifications and improvements will occur to those skilled in the art upon a reading of the foregoing description. Other means can be employed for aligning or orienting the fibers before they are fed into the nip of the chopper. Additionally, the cutter and chopper can be of different configuration. For example, the pressure roller of the cutter can be circumferentially grooved to receive the cutting blades. Also, the pressure roller of the chopper can be include axially aligned grooves to receive the chopper blades. It should be understood that all such modifications and improvements have been deleted herein for the sake of conciseness and readability but are properly within the scope of the follow claims.

What is claimed is:

1. An apparatus for cutting a plurality of fiberglass filaments to form fiberglass staple fibers having a maximum length comprising:

a) a cutter having a cutting roller with a plurality of spaced, circular, cutting blades mounted thereon, and a pressure roller positioned parallel to said cutting roller and forming a nip therewith;

b) a chopper having a chopping roller with a plurality of parallel chopping blades extending radially therefrom, and a pressure roller positioned parallel to said chopping roller and forming a nip therewith; and c) an aligner between said cutter and chopper to receive fiber segments from said cutter and discharge said fibers to said chopper, said aligner including grooves to align said fiber segments parallel to each other and transverse to said chopper blades.

2. The apparatus of claim 1, further including a feeder for feeding fiberglass filaments to said cutter along a first pathway parallel to said cutting blades.

3. The apparatus of claim 2, wherein said feeder is a conveyor adapted to compress said filaments, said conveyor having a discharge end adjacent said cutter.

4. The apparatus of claim 1, wherein said aligner is comprised of a downwardly inclined surface having an upper end adjacent said cutter and a lower end adjacent said chopper, said grooves extending from said upper end to said lower end.

5. The apparatus of claim 4, wherein said surface is inclined at an angle of form about 45° to about 80°.

6. The apparatus of claim 4, wherein the distance between said grooves is from about 0.125 inch to about 2 inches.

7. A method of cutting a plurality of fiberglass filaments to form fiberglass staple fibers having a predetermined maximum length comprising:

a) cutting said filaments into fiber segments;

b) aligning said fiber segments parallel to each other along a pathway; and c) cutting said fiber segments to a predetermined length transversely of said pathway.

8. The method of claim 7, wherein said filaments are cut with parallel rotating circular blades.

9. The method of claim 7, further including the step of conveying said filaments with compression prior to cutting of said filaments into fiber segments.

10. The method of claim 7, wherein said filaments are cut between a cutting roller having a rotatable shall with a plurality of equally spaced, circular, cutting blades mounted thereon, and a resilient surface.

11. The method of claim 10, wherein said resilient surface is a roller having a resilient covering positioned to engage the outer edges of said cutting blades.

12. The method of claim 7, wherein said fiber segments are cut with a chopping roller having a plurality of parallel chopping blades extending radially therefrom, and a resilient surface positioned to engage said chopping blades.

13. The method of claim 12, wherein said resilient surface is a roller having a resilient coveting positioned to engage the outer edges of said chopping blades.

14. The method of claim 7, wherein said filaments are conveyed along a substantially horizontal pathway prior to cutting, and said fiber segments are conveyed along a downwardly inclined pathway during alignment.

* * * * *